United States Patent

Berman

[15] 3,696,612

[45] Oct. 10, 1972

[54] FUEL PUMP SYSTEM FOR GAS TURBINES

[72] Inventor: Paul A. Berman, Plymouth Meeting, Pa.

[73] Assignee: Westinghouse Electric Corporation, Pittsburgh, Pa.

[22] Filed: Dec. 30, 1970

[21] Appl. No.: 102,618

[52] U.S. Cl. .............................. 60/39.14, 60/39.28
[51] Int. Cl. ................................................ F02c 7/26
[58] Field of Search .................. 60/39.14, 39.28, 243

[56] References Cited

UNITED STATES PATENTS

| | | | |
|---|---|---|---|
| 2,695,055 | 11/1954 | Cruckshank | 60/243 |
| 2,989,842 | 6/1961 | Wood | 60/24.3 X |
| 3,011,308 | 12/1961 | Wotring | 60/243 X |
| 3,310,937 | 3/1967 | Smith | 60/39.14 |

Primary Examiner—Clarence R. Gordon
Attorney—A. T. Stratton, F. P. Lyle and F. Cristiano, Jr.

[57] ABSTRACT

A fuel pump system for a gas turbine of the type in which a main fuel pump is normally driven by an electric motor powered from an external electrical network. An auxiliary fuel pump is connected in a parallel hydraulic circuit arrangement with the main fuel pump and is activated by a battery-driven motor or driven by a mechanical starting device for the turbine when it becomes necessary to "black start" the turbine with no external source of electrical power available for the main fuel pump.

7 Claims, 1 Drawing Figure

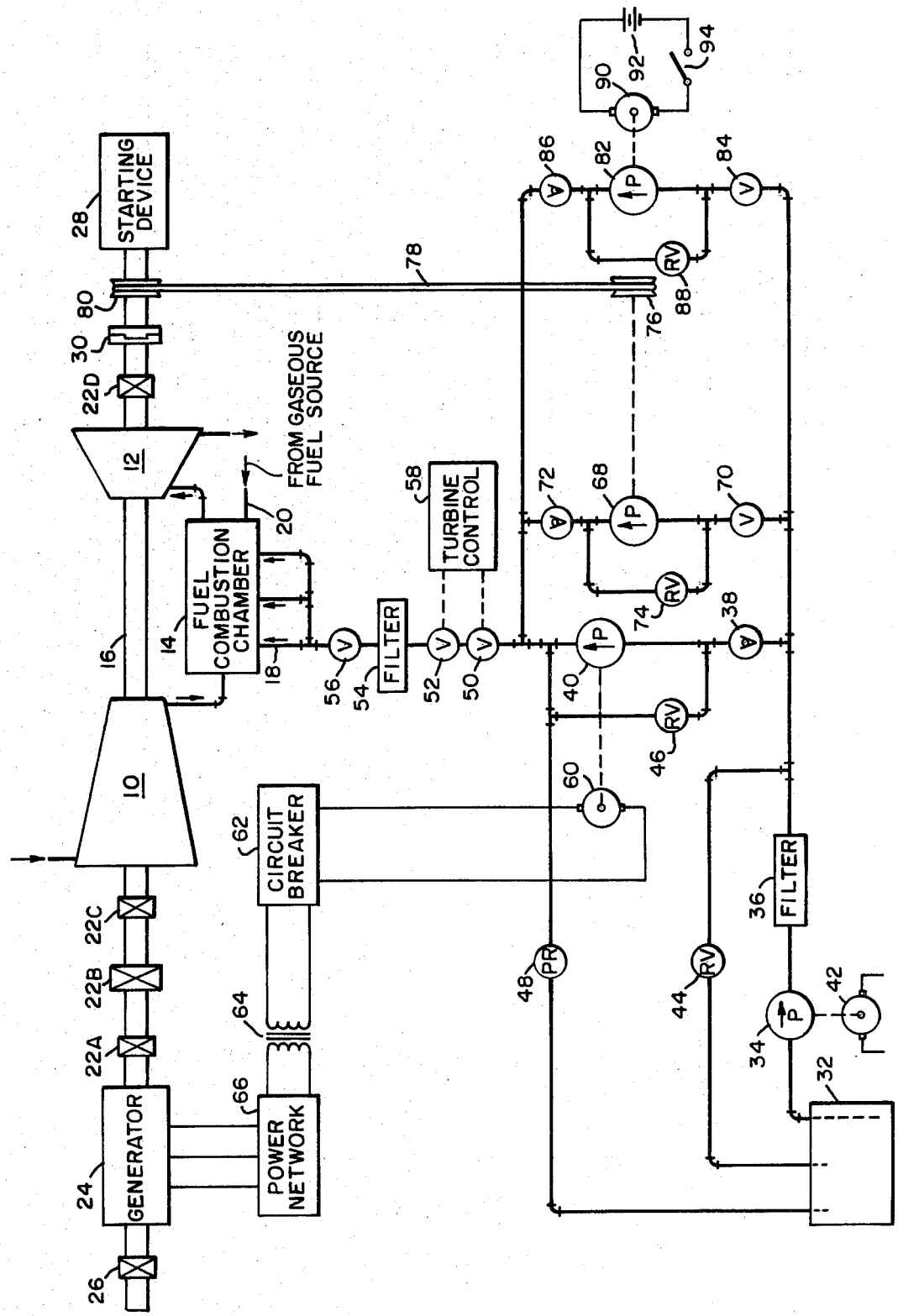

FUEL PUMP SYSTEM FOR GAS TURBINES

BACKGROUND OF THE INVENTION

While not limited thereto, the present invention is particularly adapted for use with gas turbines of the type which can burn either liquid or gaseous fuel to generate the motive gases. Usually, the liquid fuel pump for a turbine of this type is driven by the shaft of the turbine through suitable gearing, or by an electrical motor powered by an external source of electrical power. If the fuel pump is gear-driven from the turbine shaft, it becomes an unnecessary power drain when the turbine is operating on gaseous fuel unless a clutch is interposed between the pump and the turbine shaft. A clutch of this type, however, presents major design problems since it must be capable of engaging when the turbine is at rated speed and the pump is at standstill. For these reasons, a pump powered by an external electric motor is usually desired.

It may become necessary to "black start" a gas turbine for an electrical generator, during which time no external electrical power is available to drive a fuel pump. A "black start" is necessary when a complete power distribution network becomes overloaded, causing the main generators feeding the network to trip. It then becomes necessary to start the turbine, but at this time there is no external source of electrical power available for driving the main fuel pump.

SUMMARY OF THE INVENTION

In accordance with the present invention, the difficulties encountered with fuel pumps mechanically coupled to the turbine shaft are eliminated, and "black start" capability is assured when driving the pump by an externally powered electric motor, by connecting at least one auxiliary pump in hydraulic parallel relationship with the main pump. This auxiliary pump is used under "black start" conditions only and is powered by batteries or, alternatively, can be mechanically coupled to a starting device for the turbine. Since the turbine requires only about one-third fuel flow at synchronous speed, no load, the power demand of this small auxiliary pump is about one-twentieth of that of the main pump and can be readily driven from either batteries or the starting device. Check valves are incorporated into the system to prevent fuel pumped by the main pump from flowing through the auxiliary pump during normal operation of the system.

With the arrangement described herein, "black start" capability of the turbine operating on liquid fuel is assured without the power drain associated with a large capacity fuel pump. At the same time, in a dual fuel turbine, the system permits the turbine to operate on gaseous fuel without requiring continuous operation of the liquid fuel pump or a clutch for the liquid fuel pump. Finally, the system of the invention provides a liquid fuel pump system, the failure of which will not jeopardize the ability of the unit to run on gaseous fuel.

DESCRIPTION OF THE PREFERRED EMBODIMENT

The above and other objects and features of the invention will become apparent from the following detailed description taken in connection with the accompanying single FIGURE drawing which schematically illustrates an embodiment of the invention.

With reference now to the drawing, there is shown a gas turbine power plant comprising a compressor portion 10, a turbine portion 12, and a fuel combustion chamber 14 interposed between the compressor 10 and the turbine 12. The compressor 10 and turbine 12 are provided with rotor structures, not shown, connected to each other by a shaft 16. Liquid fuel is injected into the combustion chamber 14 by means of injection nozzles 18. Alternatively, the fuel supplied to the combustion chamber 14 can be a gaseous fuel supplied via conduit 20 from a suitable gaseous fuel source, not shown. In the operation of the turbine, air enters the compressor 10, is compressed, and is then fed to the combustion chamber 14 where it is mixed with the fuel, either gaseous or liquid, and ignited. The hot gaseous products of combustion are then directed against the blades of the rotor structure in the turbine 12, causing the shaft 16 to turn.

The shaft 16, which may be of one continuous length or formed in sections, is supported in suitable bearings 22A, 22B, 22C and 22D. The left end of the shaft 16, as shown in the drawing, is connected to an alternating current, three-phase generator 24 having a bearing 26 for supporting the left end of the generator main shaft as shown.

As was explained above, in order to start a turbine of the type shown in the drawing, an external source of cranking power is required to rotate the turbine to a speed of about 45 percent of its normal speed before it can run on its own power. In the drawing, the starting device is indicated generally by the reference numeral 28 and may, for example, comprise a diesel engine. The starting device 28 is adapted to be coupled to the shaft 16 through a clutch 30 which is a slip-type coupling such as a hydraulic or pneumatic torque converter. A slip-type coupling of this type is desired since, in order to develop the torque required to accelerate the turbine from rest, the speed of the starting device (i.e., a diesel engine) must be well above its minimum idle speed. Accordingly, a clutch which does not provide for slippage would not be satisfactory.

In the normal operation of the turbine, fuel from a storage tank 32 is pumped by a transfer pump 34 through a filter 36 and a check valve 38 to the inlet or suction side of a main fuel pump 40. The transfer pump 34, which is required only in those cases where the fuel tank is substantially below the level of the pump 40, is driven by an electric motor 42. A relief valve 44 connects the outlet side of the filter 36 back to the fuel tank 32 to relieve pressure in the event that the pump 40, for example, might not be operating. In parallel with the pump 40 is a relief valve 46; while a pressure regulator 48 connects the outlet or pressure side of the pump 40 back to the fuel tank 32. Should the pressure at the outlet side of the pump 40 become excessive, the pressure regulator 48 will bleed back a portion of the fuel to maintain the pressure at the outlet side of the pump constant.

Fuel under pressure at the outlet side of the pump 40 is connected through valves 50 and 52, a filter 54, and an isolation valve 56 to the nozzles 18. The valve 50 is an overspeed trip valve; while valve 52 is the main throttle valve for the system. These two valves 50 and 52 are controlled by the main turbine control system, schematically illustrated by the block 58 in the drawing. Should an overspeed condition occur, the valve 50 will be closed. The valve 52 is manipulated by the control 58 to adjust the speed of the turbine.

The pump 40 is driven by an electrical motor connected through a circuit breaker 62 and transformer 64 to an external power network, such as the power network of a public utility. Alternatively, it could be connected to a pony generator connected to the shaft of the main generator. The three-phase output of the generator 24 is also connected to the power network, along with other generators in the overall power system.

As was explained above, it sometimes happens that a complete power network becomes overloaded, causing the main generators feeding the network to trip, or an outage affecting part or all of the network may occur for other reasons. It then becomes necessary to start or restart the turbine 10, 12; however at this time no source of power is available for the main fuel pump motor 60. Therefore, and in accordance with the present invention, one or more auxiliary fuel pumps are connected in parallel with the main fuel pump 40 and are used to pump fuel to the nozzles 18 during a "black start."

One such auxiliary pump is identified by the reference numeral 68 in the drawing. Its suction or inlet side is connected through valve 70 to the outlet side of filter 36; while its pressure side is connected through check valve 72 to the pressure side of pump 40. A relief valve 74, corresponding to relief valve 46 for main pump 40, is connected in parallel with the auxiliary pump 68.

The pump 68 is connected through a pulley 76, a belt 78 and a pulley 80 to the output shaft of the starting device 28. Thus, when the starting device 28 is operating prior and during a "black start," the pump 68 is driven. At this time, the valve 70 is open. Fuel will flow through the valve 70, the pump 68 and check valve 72 to the inlet of valve 50, thereby supplying fuel to the nozzles 18. The motor 42 at this time is switched to a direct current power source, such as a battery, in order to insure a sufficient flow of fuel to the inlet side of the pump 68.

Also in parallel with the main pump 40 is a second auxiliary pump 82 having its inlet or suction side connected through a manual valve 84 to the outlet side of filter 36. The pressure or outlet side of the pump 82 is connected through check valve 86 to the pressure side of pump 40 such that when the pump 82 is operated and valve 84 is opened, fuel will flow from the filter 36 through the pump 82 and to the fuel nozzles 18. The pump 82, like pumps 68 and 40, is provided with a parallel relief valve 88. The auxiliary pump 82, in this case, is driven by a small direct current motor 90 powered by means of a battery 92. The battery 92 may be connected to the motor 90 by closing switch 94.

From the foregoing, it will be seen that during normal operation of the system with the pump 40 operating, the valves 70 and 84 will be closed. Check valves 72 and 86 prevent fuel at the output or pressure side of the pump 40 from flowing backwardly through the pumps 68 and 82. However, should it become necessary to restart the turbine under "black start" conditions, either the valve 70 or the valve 84 will be opened and fuel will be supplied to the turbine nozzles through pump 68 or 82. In most systems, it will not be necessary to employ two auxiliary pumps; however two pumps have been shown herein for purposes of illustrating the different ways in which the auxiliary pumps can be driven (i.e., either by a mechanical connection to the starting device or by a battery). Once the turbine is started and the generator 24 and/or other generators connected to the power network 66 are delivering output power, the circuit breaker 62 will again be closed, the valve 70 or 84 closed, and the pump 68 or 82 deactivated. The size of the pump 68 or 82 need be very small compared with the size of pump 40 since at synchronous speed with no load on the turbine, the fuel flow is only about one-third that required when the turbine is loaded.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a fuel supply system for a gas turbine having fuel nozzles disposed in a combustion chamber, the combination of a fuel tank, a main fuel pump having a suction port connected to said fuel tank and an outlet port connected to said fuel nozzles, an electric motor connected to said main fuel pump for driving the same, a source of electrical power for said electric motor, at least one auxiliary fuel pump connected in hydraulic parallel relationship with said main pump, and means for driving said auxiliary pump to deliver fuel to said nozzles when said source of external power is not available during startup of said turbine.

2. The system of claim 1 wherein said means for driving said auxiliary pump comprises a direct current motor, and a battery for supplying power to said direct current motor.

3. The system of claim 1 wherein said turbine is equipped with a starting device, and including means for mechanically coupling said starting device to said auxiliary fuel pump to drive the same during start-up of the turbine.

4. The system of claim 1 including a check valve interposed between the output pressure side of said auxiliary pump and said nozzles to prevent fluid pumped by said main pump from flowing through the auxiliary pump.

5. The system of claim 1 wherein said combustion chamber is provided with means for burning gaseous fuel in addition to liquid fuel to drive the turbine.

6. The system of claim 1 wherein said source of electrical power for said electric motor is an external power network, a generator connected to the shaft of said turbine, and means connecting the output of said generator to said power network.

7. The system of claim 6 including circuit breaker means interposed between said power network and said electric motor.

* * * * *